(12) United States Patent
Coutts et al.

(10) Patent No.: US 12,395,251 B1
(45) Date of Patent: Aug. 19, 2025

(54) APPARATUS, SYSTEM, AND METHOD FOR CALIBRATING BEAMFORMING ANTENNAS TO ACHIEVE OPTIMIZED COVERAGE

(71) Applicant: Meta Platforms Technologies, LLC, Menlo Park, CA (US)

(72) Inventors: Gordon Coutts, Woodinville, WA (US); Liang Han, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 422 days.

(21) Appl. No.: 18/068,516

(22) Filed: Dec. 19, 2022

(51) Int. Cl.
*H04B 17/12* (2015.01)
*H04B 7/06* (2006.01)

(52) U.S. Cl.
CPC ........... *H04B 17/12* (2015.01); *H04B 7/0617* (2013.01)

(58) Field of Classification Search
CPC ........ H04B 17/10; H04B 17/11; H04B 17/12; H04B 17/14; H04B 7/06; H04B 7/0615; H04B 7/0617
See application file for complete search history.

(56) References Cited

U.S. PATENT DOCUMENTS

| | | | | |
|---|---|---|---|---|
| 11,322,838 | B1* | 5/2022 | Ramachandran | H01Q 3/267 |
| 11,757,183 | B2* | 9/2023 | Carlsson | H01Q 23/00 |
| | | | | 343/700 R |
| 2017/0346575 | A1* | 11/2017 | Tang | H04B 7/0617 |
| 2020/0295972 | A1* | 9/2020 | Hemo | H04B 7/0408 |

FOREIGN PATENT DOCUMENTS

| | | | | |
|---|---|---|---|---|
| WO | WO-2017153984 | A1 * | 9/2017 | H01Q 3/267 |
| WO | WO-2021213658 | A1 * | 10/2021 | H04B 17/12 |

\* cited by examiner

*Primary Examiner* — Siu M Lee
(74) *Attorney, Agent, or Firm* — Morgan, Lewis & Bockius LLP

(57) ABSTRACT

An antenna system comprising (1) an array of antennas capable of beamforming and (2) at least one controller communicatively to the array of antennas, wherein the controller (A) collects a first set of measurements taken at each of the antennas as the antennas are activated individually, (B) collects a second set of measurements taken at each of the antennas as pairs of the antennas are activated together, (C) determines one or more inefficiencies in the beamforming of the antennas based at least in part on the first and second sets of measurements, and (D) calibrates the antennas to improve the beamforming by modifying one or more phase shifters of the antennas to compensate for the inefficiencies in the beamforming Various other apparatuses, systems, and methods are also disclosed.

20 Claims, 12 Drawing Sheets

APPARATUS, SYSTEM, AND METHOD FOR CALIBRATING BEAMFORMING ANTENNAS TO ACHIEVE OPTIMIZED COVERAGE

BRIEF DESCRIPTION OF DRAWINGS

The accompanying Drawings illustrate a number of exemplary embodiments and are parts of the specification. Together with the following description, the Drawings demonstrate and explain various principles of the instant disclosure.

Figure 1:
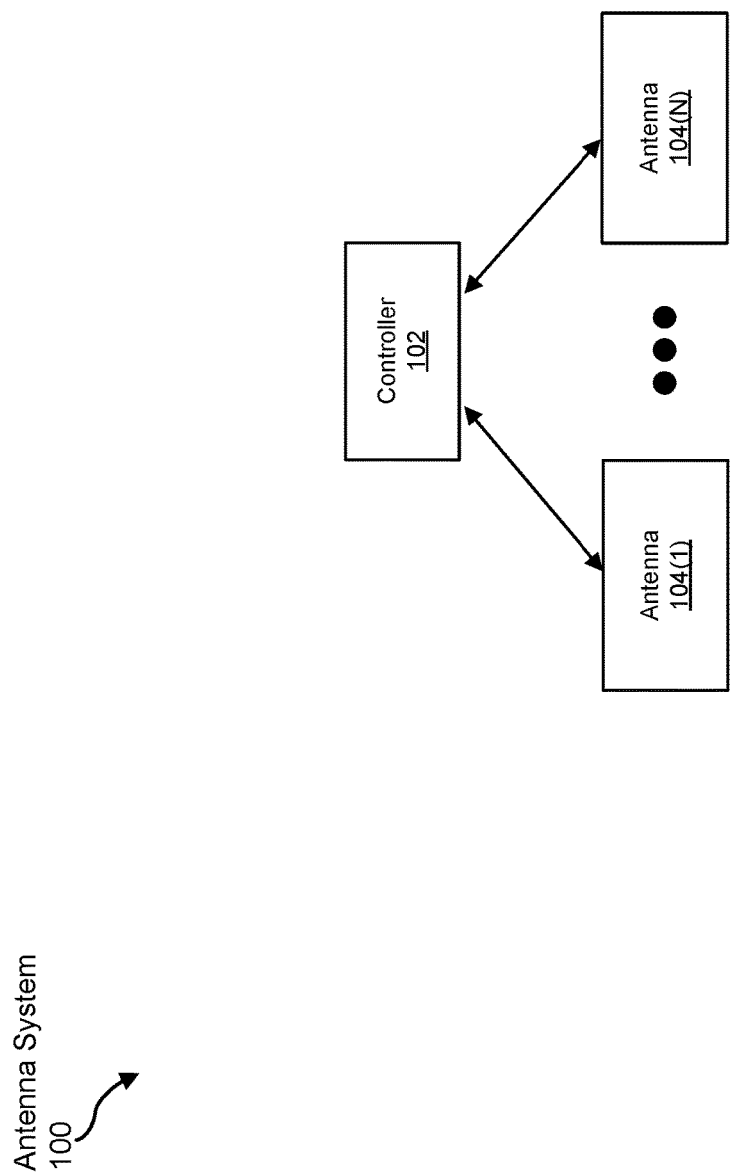
FIG. 1 is a block diagram of an exemplary antenna system capable of calibrating beamforming antennas to achieve optimized coverage according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for calibrating beamforming antennas to achieve optimized coverage. As will be explained in greater detail below, these apparatuses, systems, and methods may provide numerous features and benefits.

To achieve optimal performance and/or coverage, certain antenna systems (such as phased arrays) may need to align the amplitude and/or phase of several antenna elements. For example, a phased array may be implemented on a circuit board that includes multiple layers and various components, such as a controller and a set of antenna elements. In this example, the antenna elements may fan and/or spread out from the controller at varying distances. As a result, the antenna elements may be communicatively connected and/or coupled to the controller via traces of varying lengths. Unfortunately, these varying trace lengths may cause and/or lead to differences in the amplitude and/or phase among the antenna elements, thereby potentially impairing the performance and/or coverage of the phased array.

Many factors may cause and/or lead to variation in and/or misalignment of the amplitude and/or phase of such antenna elements. Examples of such factors include, without limitation, differences in trace lengths between radio frequency (RF) front ends and antenna feeds, differences in trace lengths between the controller and RF front ends, process variation of phase shifters implemented with the antenna elements, effects from component tolerances, antenna steering angles, effects from manufacturing variations, combinations or variations of one or more of the same, and/or any other factors capable of causing differences in amplitude and/or phase across antenna elements. The instant disclosure, therefore, identifies and addresses a need for additional apparatuses, systems, and methods that facilitate calibrating beamforming antennas to achieve optimized coverage.

In some examples, the various apparatuses, systems, and/or methods disclosed herein may be able to calibrate phased array antenna systems without phase-locking to costly test equipment. To accomplish this kind of calibration, a phased array antenna system may be positioned and/or maintained at a fixed angle (e.g., broadside). In one example, a controller for the phased array antenna system may cycle through all the phase-shifter states of each antenna feed included in the system. In this example, the controller may record the measured amplitudes of the transmit and/or receive signals for each phase-shifter state of the antenna elements. After measuring those amplitudes, the controller may activate two antenna elements (e.g., one designated reference element and one other element) at a time and then cycle through all the phase-shifter states again for each two-element combination.

In one example, the controller may record the amplitude and/or phase measurements of the various antenna elements relative to the reference element. By doing so, the controller may determine and/or calculate the amplitude and/or phase errors present and/or detected across the antenna elements. In this example, the controller may determine and/or compute settings and/or states for the phase shifters implemented with those antenna elements based at least in part on the amplitude and/or phase errors. The controller may then calibrate those phase shifters in accordance with those settings and/or states to compensate for the amplitude and/or phase errors. Such calibration of the phase shifters may improve the beamforming, performance, and/or coverage of the phased array antenna system.

The following will provide, with reference to FIGS. 1-6, detailed descriptions of exemplary devices, systems, components, and corresponding implementations for calibrating beamforming antennas to achieve optimized coverage. In addition, detailed descriptions of methods for calibrating beamforming antennas to achieve optimized coverage in connection with FIG. 7. The discussion corresponding to FIGS. 8-12 will provide detailed descriptions of types of exemplary artificial-reality devices, wearables, and/or associated systems capable of calibrating beamforming antennas to achieve optimized coverage.

FIG. 1 illustrates a portion of an exemplary antenna system 100 capable of calibrating beamforming antennas to achieve optimized coverage. In some examples, antenna system 100 may include and/or represent a phased array that produces, radiates, and/or emits a beam of radio waves capable of being steered electrically or electronically to different directions. As illustrated in FIG. 1, exemplary antenna system 100 may include and/or represent a controller 102 and an array of antennas 104(1)-(N) capable of beamforming. In certain examples, controller 102 may be communicatively coupled to antennas 104(1)-(N). In one example, controller 102 may collect and/or record a first set of measurements taken at each of antennas 104(1)-(N) as antennas 104(1)-(N) are activated individually and/or in isolation. Additionally or alternatively, controller 102 may collect and/or record a second set of measurements taken at each of antennas 104(1)-(N) as pairs of antennas 104(1)-(N) are activated together and/or simultaneously.

In some examples, controller 102 may determine and/or compute one or more inefficiencies (such as amplitude and/or phase errors or discrepancies) in the beamforming of antennas 104(1)-(N) based at least in part on the first and second sets of measurements. In such examples, controller 102 may calibrate antennas 104(1)-(N) to improve the beamforming by modifying one or more phase shifters of antennas 104(1)-(N) to compensate for the inefficiencies in the beamforming. For example, because optimized beamforming results from synchronized amplitudes and phases, controller 102 may change and/or alter the settings and/or states of antennas 104(1)-(N) via their phase shifters to correct and/or compensate for amplitude and/or phase errors or discrepancies across antennas 104(1)-(N). By doing so, controller 102 may effectively align and/or match the amplitude and/or phase of the RF signal radiated by each of antennas 104(1)-(N) with one another. Such alignment and/or matching may create and/or produce a pattern of constructive and/or destructive interference from the collective RF signals radiated by antennas 104(1)-(N) to achieve better performance and/or optimize coverage of antenna system 100.

In some examples, the first set of measurements collected by controller 102 may include and/or represent isolated amplitude values and/or levels of each of antennas 104(1)-(N) when activated individually. For example, controller 102 may cycle and/or sweep through all the phase-shifter states of each of antennas 104(1)-(N). Specifically, controller 102 may cause and/or direct antenna 104(1) to radiate an RF signal in isolation while all the other antennas remain inactive. In this example, while antenna 104(1) radiates the RF signal, controller 102 may switch through all the phase-shifter states of the antenna feed communicatively coupled to antenna 104(1).

In some examples, controller 102 and/or a corresponding sensor may measure the amplitude of the RF signal radiated by antenna 104(1) at each of those phase-shifter states. In one example, controller 102 and/or the corresponding sensor may take and/or collect those amplitude measurements for both transmit and/or receive states or configurations at antenna 104(1). In this example, controller 102 may then collect and/or record the amplitude value and/or level of the transmit and/or receive signals at each of those phase-shifter states. Controller 102 may also perform and/or complete those same steps and/or procedures for every other antenna included in antennas 104(1)-(N).

In some examples, the second set of measurements collected by controller 102 may include and/or represent combined amplitude values and/or levels of antennas 104(1)-(N) when activated in pairs. For example, controller 102 may select and/or designate one of antennas 104(1)-(N) as a reference whose phase is normalized to zero. In this example, controller 102 may cycle and/or sweep through all the phase-shifter states of the reference and/or each antenna under test as they radiate an RF signal together and/or simultaneously. Specifically, controller 102 may cause and/or direct antennas 104(1) and 104(2) to radiate the RF signal simultaneously, thereby forming a combined beam, while all the other antennas remain inactive. In this example, while antennas 104(1) and 104(2) radiate the RF signal together, controller 102 may switch through all the phase-shifter states of the antenna feeds communicatively coupled to antennas 104(1) and 104(2).

In one example, controller 102 may cycle and/or sweep through all the phase-shifter states of each antenna under test while keeping and/or maintaining the reference antenna in a single phase-shifter state. For example, as antennas 104(1) and 104(2) radiate the RF signal together, controller 102 may switch through all the phase-shifter states of the antenna feed communicatively coupled to antenna 104(2) but keep and/or maintain the phase-shifter state of the antenna feed communicatively coupled to antenna 104(1) intact and/or unchanged.

In some examples, controller 102 and/or a corresponding sensor may measure the amplitudes and/or phases of the RF signals radiated by antennas 104(1) and 104(2) at each of those phase-shifter states. In one example, controller 102 and/or the corresponding sensor may take and/or collect those amplitude and/or phase measurements for both transmit and/or receive states or configurations at antennas 104(1) and 104(2). In this example, controller 102 may then collect and/or record the amplitude and/or phase values and/or levels of the transmit and/or receive signals at each of those phase-shifter states. Controller 102 may also perform and/or complete those same steps and/or procedures for every pair of antennas 104(1)-(N) that includes antenna 104(1) as a reference. Additionally or alternatively, controller 102 may perform and/or complete those same steps and/or procedures for every pair of antennas 104(1)-(N) that includes at least one other antenna as a reference to facilitate and/or support measuring or testing antenna 104(1) in a non-reference capacity (as will be described in greater detail below in connection with FIGS. 5 and 6).

In some examples, controller 102 may determine and/or calculate the relative phase and/or phase difference of every pair of antennas 104(1)-(4) at each of the phase-shifter states. For example, controller 102 may measure, determine, and/or calculate the phase of antenna 104(2) relative to the phase of antenna 102(1) for each of the phase-shifter states while antennas 104(1) and 104(2) radiate the RF signal simultaneously. In one example, and as will be described in greater detail below in connection with FIG. 4, controller 102 may calculate the relative phase and/or phase difference of antennas 104(1) and 104(2) based at least in part on the individual amplitude measurements taken as antennas 104(1) and 104(2) radiate the RF signal in isolation as well as the combined amplitude measurements taken as antennas 104(1) and 104(2) simultaneously radiate the RF signal.

In some examples, controller 102 may include and/or represent any type or form of hardware-implemented processing device and/or component capable of interpreting and/or executing computer-readable instructions. Controller 102 may access, execute, and/or modify certain software and/or firmware modules to support and/or facilitate calibrating beamforming antennas to achieve optimized coverage. In one example, controller 102 may include and/or represent at least one radio-frequency integrated circuit (RFIC) incorporated in a wireless device and/or an artificial-reality device. In this example, the RFIC may contain and/or implement various components that support and/or facilitate RF communications via antenna system 100. Examples of such components includes, without limitation, radios, RF front ends, tuners, amplifiers, transmission lines, phase shifters, circulators, filters, switches, transceivers, transmitters, receivers, sensors, storage devices, variations or combinations of one or more of the same, and/or any other suitable components.

Additionally or alternatively, controller 102 may include and/or represent a circuit comprised of various components (e.g., transceivers, transmitters, receivers, sensors, storage devices, etc.) that collectively support and/or facilitate calibrating beamforming antennas to achieve optimized coverage. Additional examples of controller 102 include, without limitation, physical processors, Central Processing Units (CPUs), microprocessors, microcontrollers, Field-Programmable Gate Arrays (FPGAs) that implement softcore processors, Application-Specific Integrated Circuits (ASICs), Systems on a Chip (SoCs), integrated circuits, portions of one or more of the same, variations or combinations of one or more of the same, and/or any other suitable controller.

In some examples, antennas 104(1)-(N) may each include and/or represent any type or form of device and/or interface that facilitates and/or supports the propagation of radio waves between metal conductors and/or space (e.g., air). In one example, antennas 104(1)-(N) may each include and/or represent part of at least one radio that transmits and/or receives communications via space. In this example, the radio may include and/or represent various other components as well, including RF front ends, tuners, amplifiers, transmission lines, phase shifters, circulators, filters, switches, transceivers, transmitters, receivers, antenna elements, combinations or variations of one or more of the same, and/or any other suitable components.

Figure 2:
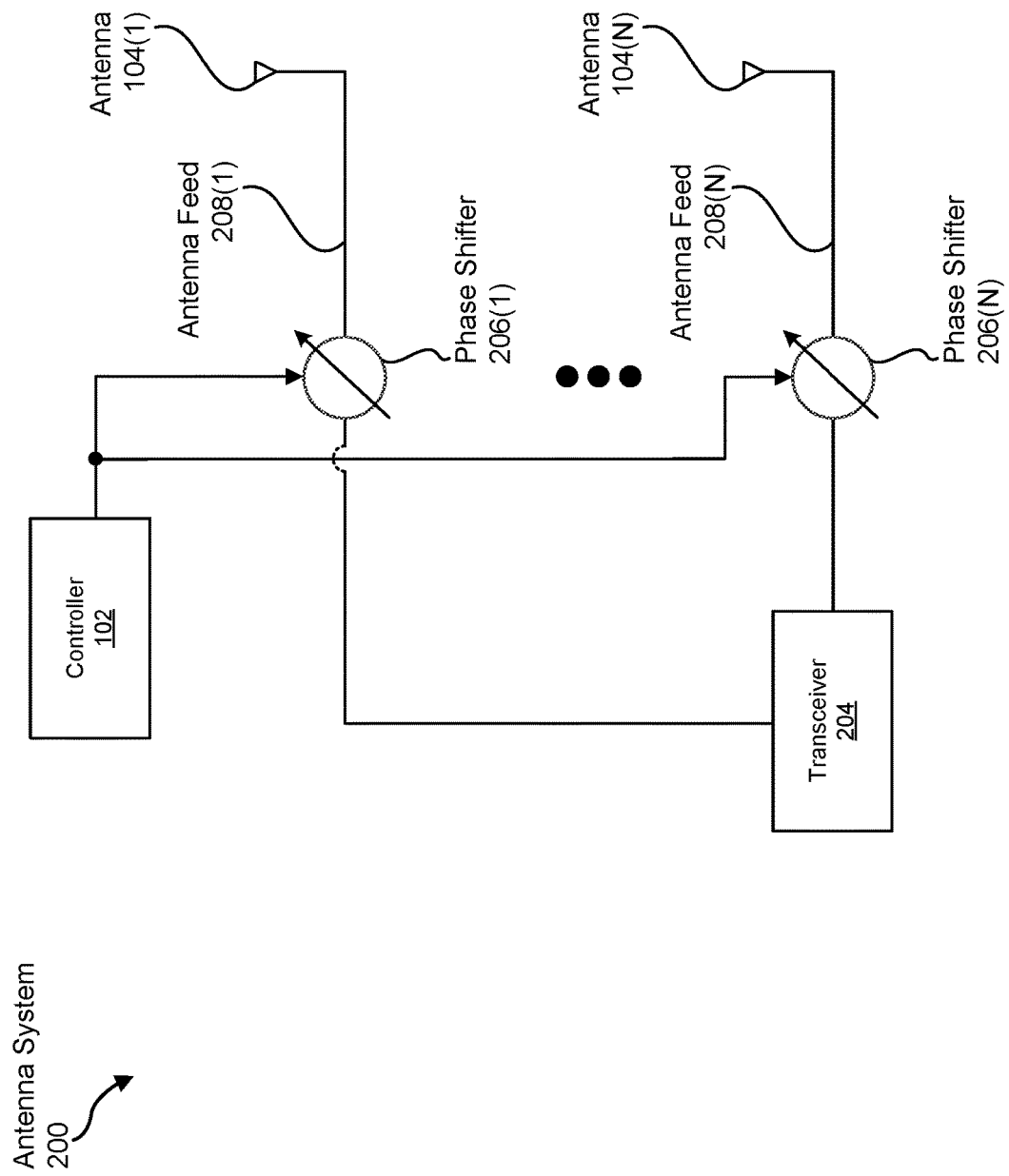
FIG. 2 is an illustration of an exemplary antenna system capable of calibrating beamforming antennas to achieve optimized coverage according to one or more embodiments of this disclosure.

FIG. 2 illustrates a portion of an exemplary antenna system 200 capable of calibrating beamforming antennas to achieve optimized coverage. In some examples, antenna system 200 may include and/or represent certain components, configurations, and/or features that perform and/or provide functionalities that are similar and/or identical to those described above in connection with FIG. 1. As illustrated in FIG. 2, exemplary antenna system 200 may include and/or represent controller 102, array of antennas 104(1)-(N), phase shifters 206(1)-(N), and at least one transceiver 204. In one example, controller 102 may be communicatively coupled to phase shifters 206(1)-(N) to facilitate programming and/or configuring the same. Additionally or alternatively, transceiver 204 may be communicatively coupled to phase shifter 206(1)-(N) to facilitate radiating, transmitting, and/or receiving RF signals via antennas 104(1)-(N).

In some examples, antennas 104(1)-(N) may be communicatively coupled to phase shifters 206(1)-(N) via antenna feeds 208(1)-(N), respectively. In such examples, phase shifters 206(1)-(N) may be communicatively coupled between transceiver 204 and antenna feeds 208(1)-(N), respectively. Although transceiver 204 is illustrated as a standalone component and/or feature in FIG. 2, transceiver 204 may alternatively represent part of and/or be included in controller 102. Moreover, although transceiver 204 is illustrated as a single component and/or unit in FIG. 2, transceiver 204 may alternatively include and/or represent a plurality of independent transceivers. Accordingly, antenna system 200 may alternatively include and/or represent a different transceiver for each of antennas 104(1)-(N).

In some examples, phase shifters 206(1)-(N) may each include and/or represent any type or form of device and/or component capable of changing the phase and/or angle of RF signals. In one example, phase shifters 206(1)-(N) may be configurable and/or programmable to modify the phase angle of the RF signal radiated by antennas 104(1)-(N), respectively. For example, phase shifters 206(1)-(N) may be able to slow, delay, and/or shift the phase of the RF signals radiated by antennas 104(1)-(N), respectively. In certain implementations, controller 102 may configure and/or program one or more of phase shifters 206(1)-(N) to apply and/or implement certain settings and/or states. By doing so, controller 102 may be able to modify the phase of the RF signals radiated by antennas 104(1)-(N) to align and/or match their phases and/or mitigate or eliminate any phase difference among antennas 104(1)-(N).

Figure 3:
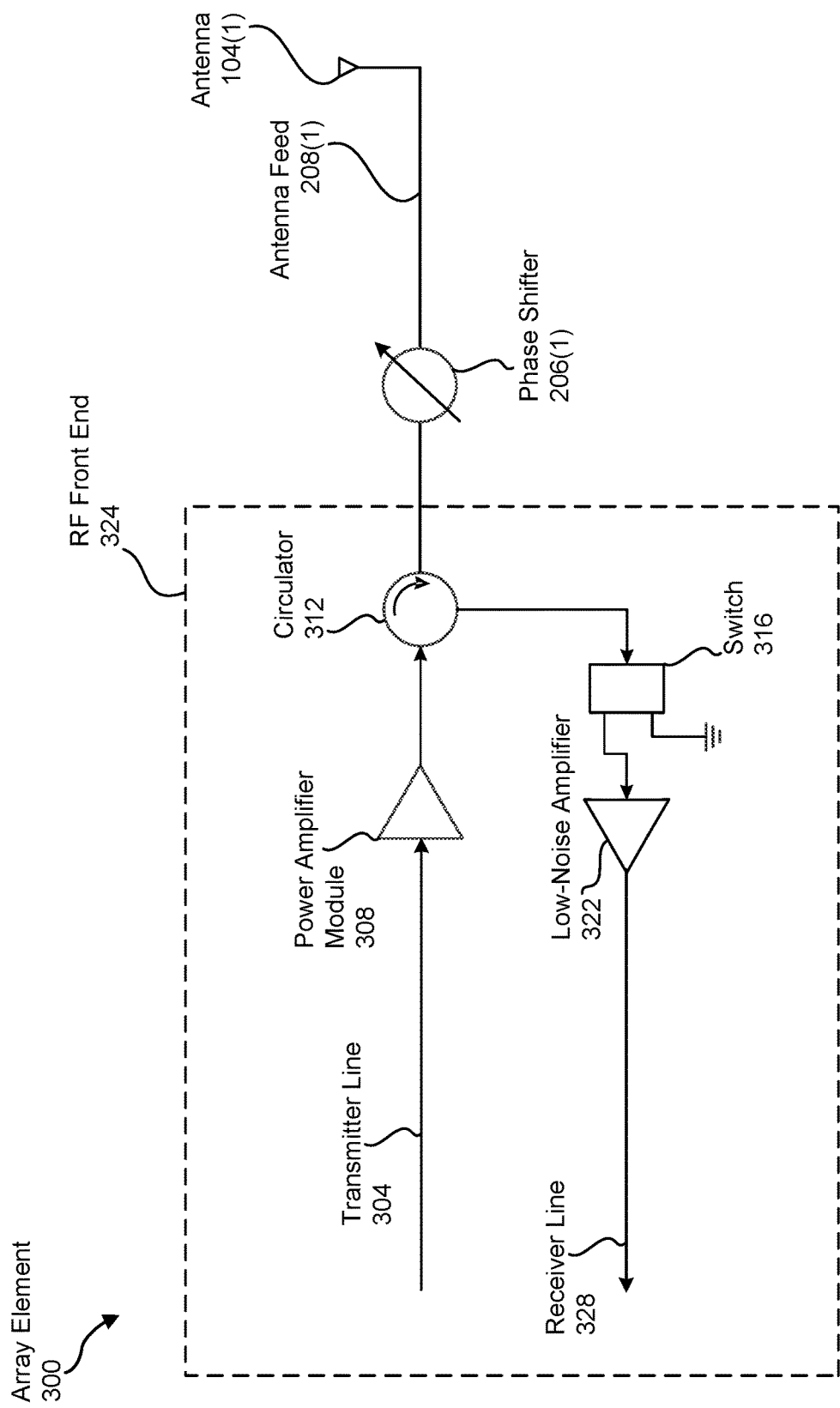
FIG. 3 is an illustration of an exemplary array element capable of being calibrated in connection with a beamforming antenna according to one or more embodiments of this disclosure.

FIG. 3 illustrates at least a portion of an exemplary array element 300 incorporated into and/or implemented by antenna system 100 or 200. In some examples, antenna element 300 may include and/or represent certain components, configurations, and/or features that perform and/or provide functionalities that are similar and/or identical to those described above in connection with FIG. 1 or FIG. 2. As illustrated in FIG. 3, exemplary array element 300 may include and/or represent an RF front end 324, phase-shifter 206(1), antenna feed 208(1), and/or antenna 104(1). In one example, RF front end 324 may be communicatively coupled to phase shifter 206(1) to facilitate radiating, transmitting, and/or receiving RF signals via antenna 104(1).

In some examples, although not necessarily illustrated in this way in FIG. 3, some or all of RF front end 324 may be incorporated in and/or implemented by controller 102. In one example, RF front end 324 may include and/or represent a power amplifier module 308, a circulator 312, a switch 316, a low-noise amplifier 322, a transmitter line 304, and/or a receiver line 328. In this example, transceiver 204 may be able to transmit and/or launch signals via transmitter line 304 and/or antenna 104(1). Additionally or alternatively, transceiver 204 may be able to receive and/or obtain signals via receiver line 328 and/or antenna 104(1).

In some examples, a signal may be provided and/or delivered by a certain radio component (e.g., transceiver 204 or a separate transmitter) to the input of power amplifier module 308 via transmitter line 304. In one example, the output of power amplifier module 308 may be directly or indirectly communicatively coupled to a port of circulator 312. Additionally or alternatively, another port of circulator 312 may be directly or indirectly communicatively coupled to phase shifter 206(1).

In some examples, a further port of circulator 312 may be directly or indirectly communicatively coupled to the input of switch 316. In one example, one output of switch 316 may be directly or indirectly communicatively coupled to ground (e.g., via a resistor that is not necessarily illustrated in FIG. 3). In this example, another output of switch 316 may be directly or indirectly communicatively coupled to the input of low-noise amplifier 322. In this example, the output of low-noise amplifier 322 may provide and/or deliver a signal to a certain radio component (e.g., transceiver 204 or a separate receiver) via receiver line 328.

In addition to the various components illustrated in FIG. 3, exemplary array element 300 may include and/or represent one or more other components that are not illustrated and/or labelled in FIG. 3. For example, exemplary array element 300 may include and/or incorporate additional circuitry, electrical components, filters, interfaces, sensors, transceivers, transmitters, receivers, and/or devices. Alternatively, although exemplary array element 300 includes the various components illustrated in FIG. 3, other embodiments of such an array element may omit and/or exclude the components labelled in FIG. 3. In certain implementations, one or more of the other antennas described in FIG. 1 or FIG. 2 may be incorporated in and/or implemented as a similar or identical antenna element.

Figure 4:
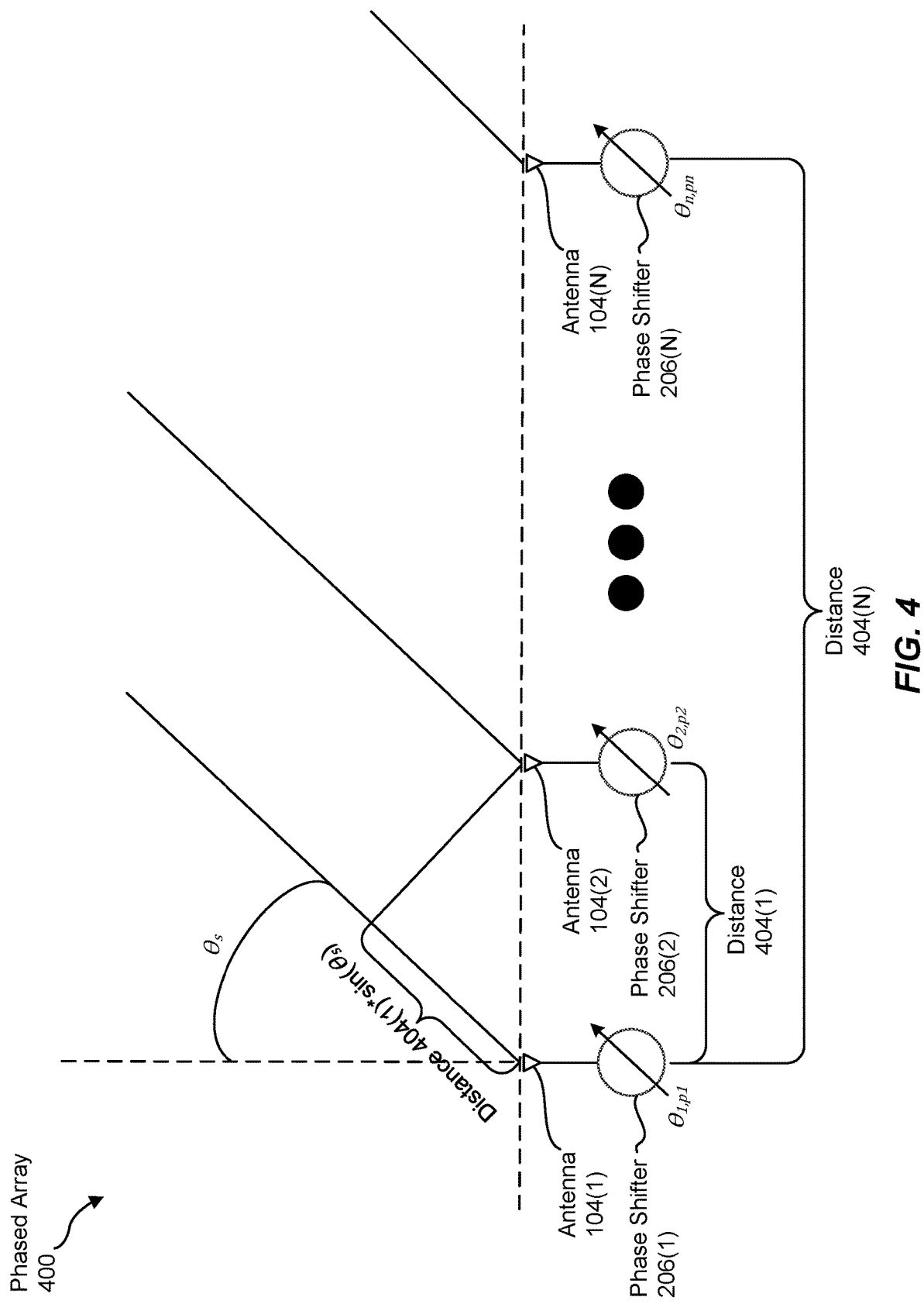
FIG. 4 is an illustration of an exemplary phased array capable of being calibrated to achieve optimized coverage according to one or more embodiments of this disclosure.

FIG. 4 illustrates at least a portion of an exemplary phased array 400 capable of calibrating beamforming antennas to achieve optimized coverage. In some examples, exemplary phased array 400 may include and/or represent certain components, configurations, and/or features that perform and/or provide functionalities that are similar and/or identical to those described above in connection with any of FIGS. 1-3. As illustrated in FIG. 4, exemplary phased array 400 may include and/or represent antennas 104(1), 104(2), and 104(N) communicatively coupled to phase shifters 206(1), 206(2), and 206(N). In one example, antennas 104(1) and 104(2) may be spaced and/or positioned at a distance 404(1) from one another. Additionally or alternatively, antennas 104(1) and 104(N) may be spaced and/or positioned at a distance 404(N) from one another.

In some examples, controller 102 may rely on certain knowledge and/or information about phased array 400 to solve for and/or compute the phases of RF signals radiated by antennas 104(1)-(N) relative to the reference element. For example, controller 102 may determine and/or compute the relative phase of an RF signal radiated across antennas 104(1)-(N) based at least in part on this formula:

$$\text{total array pattern } (\theta) = A_{1,p1}e^{j\frac{2\pi}{\lambda}d*\sin(\theta-\theta_S)+j\theta_{1,p1}} + A_{2,p2}e^{j\frac{2\pi}{\lambda}d*\sin(\theta-\theta_S)+j\theta_{2,p2}} + \ldots + A_{n,pn}e^{j\frac{2\pi}{\lambda}d*\sin(\theta-\theta_S)+j\theta_{n,pn}}.$$

In this example, the formula may correspond to and/or represent the total array pattern of a phased array with n antennas indexed by i. In this formula, d may include and/or represent the distance and/or spacing (e.g., distance 404(1) or 404(N) in FIG. 4) between the reference antenna and the antenna under test, the $\theta$ may include and/or represent the antenna pattern measurement angle, $\sigma_{i,pi}$ may include and/or represent the phase of the radiated signal at antenna i, pi may include and/or represent the setting or state of the phase shifter for antenna i, $A_{i,pi}$ may include and/or represent the amplitude of the radiated signal at antenna i configured to phaser shifter setting pi, and/or $\theta_S$ may include and/or represent the steering angle of the phased array.

In some examples, controller 102 may steer phased array 400 to radiate and/or aim broadside (e.g., orthogonal to the array of antennas) to simplify the formula. For example, when phased array 400 is steered to radiate and/or aim broadside, controller 102 may determine and/or compute the relative phase of an RF signal radiated across 104(1)-(N) based at least in part on this simplified formula: total array pattern $(\theta)=A_{1,p1}e^{j\theta_{1,p1}}+A_{2,p2}e^{j\theta_{2,p2}}+\ldots+A_{n,pn}e^{j\theta_{n,pn}}$. In this example, controller 102 and/or a corresponding sensor may take various scalar measurements to obtain and/or derive sufficient data and/or information to solve one of those formulas for the phase relative to the reference element.

In some examples, controller 102 may maintain phased array 400 physically positioned at a fixed angle (e.g., broadside). In one example, controller 102 may perform the following process and/or procedure for each antenna feed. First, controller 102 may turn on each antenna feed one at a time. Second, controller 102 may cycle and/or sweep through all the phase-shifter states for whichever antenna feed is active. Third, controller 102 may record the measured transmit and/or receive amplitudes for each phase-shifter state of the active antenna feed.

In some examples, upon measuring and/or determining the amplitudes of the radiated signal for each phase shifter state across all antenna feeds, controller 102 may perform the following process and/or procedure for each antenna feed relative to the reference antenna. First, controller 102 may turn on two antenna feeds at a time (e.g., the reference antenna and the antenna under test). Second, controller 102 may cycle and/or sweep through all the phase-shifter states for the active antenna feeds. Third, controller 102 may record the measured transmit and/or receive amplitudes for each phase-shifter state of the two active antenna feeds.

Optionally, controller 102 or a corresponding sensor may read, sense, and/or measure its temperature (e.g., on-die RFIC temperature) at one or more regions in conjunction with each amplitude measurement. Such temperature measurements may enable controller 102 to compensate for the amplitude-temperature coefficient of the RF front ends. More specifically, controller 102 may modify one or more amplitude measurements by compensating for one or more of the temperature measurements. Accordingly, controller 102 may determine and/or compute inefficiencies (such as amplitude and/or phase errors or discrepancies) in the antenna array based at least in part on the temperature measurements.

In some examples, the RF front ends may include and/or represent active components that are sensitive to temperature variation. As a result, temperature variation may alter and/or distort the amplitude response of the active components in the RF front ends, thus potentially leading to skewed amplitude measurements. In certain implementations, if temperature sensing is unavailable, phased array 400 may rely on heat sinks, active cooling, and/or delays between amplitude measurements to minimize and/or mitigate temperature variation and/or its effect on the active components in the RF front ends.

In some examples, controller 102 may determine and/or compute the relative phase of an RF signal radiated across the two active antenna feeds based at least in part on this formula: $A_{Active\ pair}=A_{ref,pref}+A_{i,pi}e^{j\theta_{i,pi}}$. In such examples, the formula may correspond to and/or represent the amplitude of the combined beam formed and/or radiated by the active pair of antennas. In one example, the active pair may include and/or represent the designated and/or selected reference antenna and another one of antennas 104(1)-(N) that is activated for combined testing. In this formula, $A_{Active\ pair}$ may include and/or represent the amplitude of the beam formed by the combined signal radiated by the reference antenna ref and the other antenna i under test, $A_{ref,pref}$ may include and/or represent the isolated amplitude of the radiated signal at antenna ref (whose phase is normalized to zero), $A_{i,pi}$ may include and/or represent the isolated amplitude of the radiated signal at antenna i, and/or $\theta_{i,pi}$ may include and/or represent the phase of the radiated signal at antenna i. Since having obtained the individual measurements for $A_{ref,pref}$ and $A_{i,pi}$ and the combined measurement for $A_{Active\ pair}$, controller 102 may be able to input those values into the formula to solve for $\theta_{i,pi}$, which represents the relative phase between antennas ref and i in this context.

In some examples, the complex exponential function $e^{j\Theta_{i,pi}}$ may render and/or cause some ambiguity relative to the phase values because the complex exponential function $e^{j\Theta_{i,pi}}$ is periodic in $2\pi$ radians. In such examples, controller 102 may resolve and/or mitigate such ambiguity with a priori knowledge of the approximate size of each phase-shifter step. For example, using information about the approximate size of each phase-shifter step, controller 102 may select, identify, and/or determine the appropriate phase value from the solution set because the phase-shifter step is typically much less than $2\pi$ radians.

In some examples, controller 102 may determine and/or compute the total array pattern produced by antennas 104(1)-(N) based at least in part on the individual amplitudes, the combined amplitudes, and/or the relative phases. In such examples, controller 102 may determine and/or compute amplitude and/or phase errors of antennas 104(1)-(N) based at least in part on the total array pattern produced by the antennas.

In some examples, controller 102 may determine and/or compute the relative phases between the pairs of antennas as the pairs of antennas are activated together across the array. In such examples, controller 102 may determine and/or compute the inefficiencies (e.g., amplitude and/or phase errors or discrepancies) in the beamforming of the antennas based at least in part on the relative phases, the individual amplitude measurements, and/or the paired amplitude measurements. For example, controller 102 may calculate the amplitude errors across the antenna array based at least in part on the individual amplitude measurements taken in isolation. Additionally or alternatively, controller 102 may calculate the phase errors across the antenna array based at least in part on the relative phases.

Figure 5:
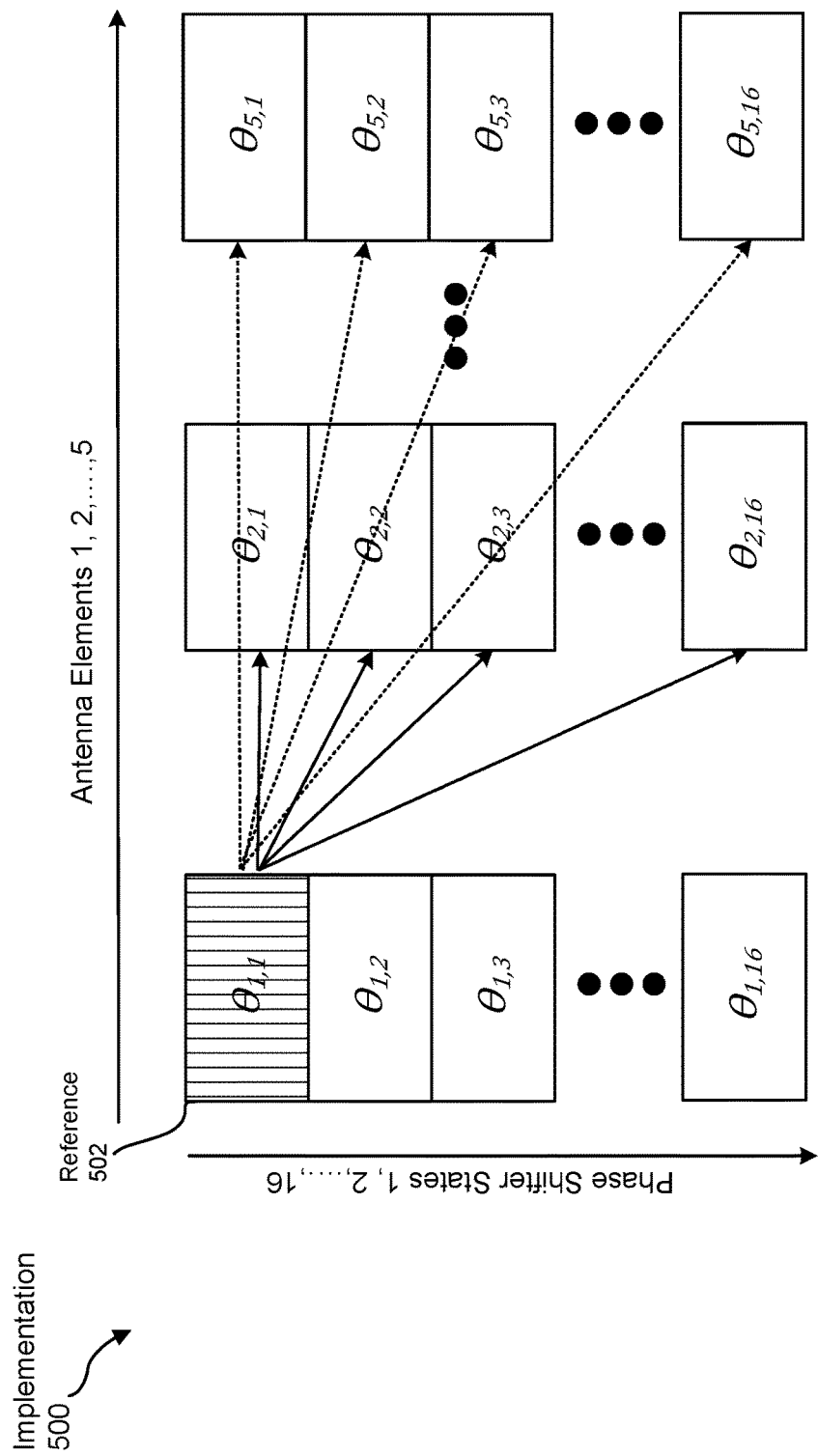
FIG. 5 is an illustration of an exemplary phased array capable of being calibrated to achieve optimized coverage according to one or more embodiments of this disclosure.
Figure 6:
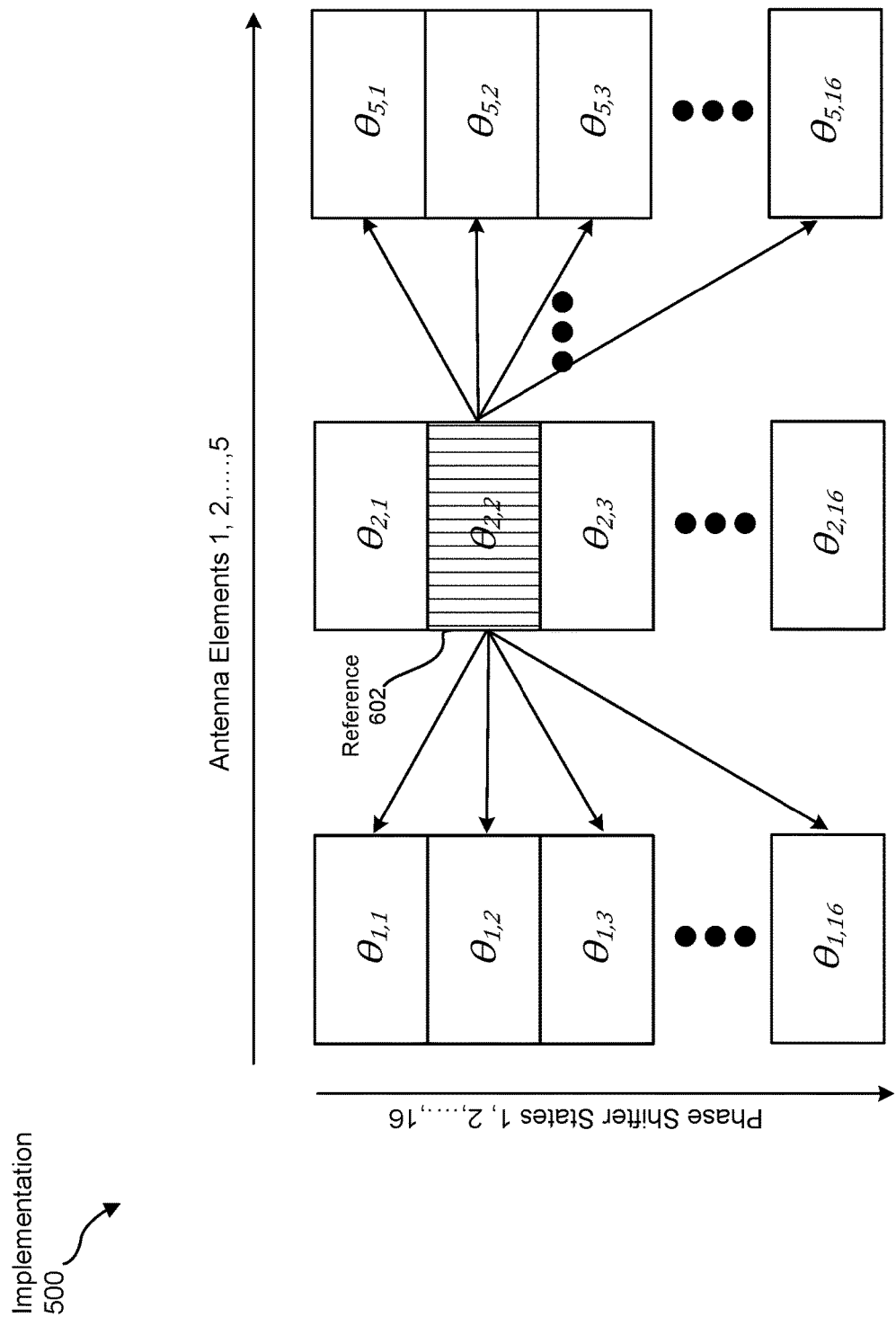
FIG. 6 is an illustration of an exemplary phased array capable of being calibrated to achieve optimized coverage according to one or more embodiments of this disclosure.

FIGS. 5 and 6 illustrate an exemplary implementation 500 for calibrating an array of antennas to achieve optimized coverage. In some examples, exemplary implementation 500 may involve certain components, configurations, and/or features that perform and/or provide functionalities that are similar and/or identical to those described above in connection with any of FIGS. 1-4. As illustrated in FIG. 5, exemplary implementation 500 may involve an array of 5 antennas capable of beamforming. In some examples, these 5 antennas may be equipped with and/or communicatively coupled to phase shifters with 16 different programmable states. In such examples, these 5 antennas and their phase-shifter states may be represented and/or denoted as $\theta_{antenna,phase\ state}$ in FIGS. 5 and 6.

In some examples, upon obtaining the individual and combined amplitude measurements with the reference antenna across the array, controller 102 may still need to determine and/or compute the phase value of the reference antenna. To do so, controller 102 may select and/or designate another antenna in the array as another reference to facilitate determining and/or computing the phase value of the initial reference antenna. For example, and as reflected in FIG. 5, controller 102 may select and/or designate the first antenna set to a specific phase-shifter state as a reference 502 for the array. In this example, controller 102 may perform an initial sweep and/or cycle of paired antenna combinations to take the combined amplitude measurements using the first antenna set to the specific phase-shifter state as reference 502.

As a specific example, this initial sweep and/or cycle may involve taking amplitude measurements of an RF signal radiated by reference 502 and the second, third, fourth, and fifth antennas in a sequential fashion. For example, and as illustrated in FIG. 5, reference 502 may remain active in the first phase-shifter state while the second antenna sweeps and/or cycles through all 16 of the phase-shifter states. Subsequently, reference 502 may remain active in the first phase-shifter state while the third antenna sweeps and/or cycles through all 16 of the phase-shifter states. Afterward, reference 502 may remain active in the first phase-shifter state while the fourth antenna sweeps and/or cycles through all 16 of the phase-shifter states. Finally, reference 502 may remain active in the first phase-shifter state while the fifth antenna sweeps and/or cycles through all 16 of the phase-shifter states.

In one example, and as reflected in FIG. 6, controller 102 may select and/or designate the second antenna set to a specific phase-shifter state as a reference 602 for the array. In this example, controller 102 may perform a subsequent sweep and/or cycle of paired antenna combinations to take the combined amplitude measurements using the second antenna set to the specific phase-shifter state as reference 602.

As a specific example, this subsequent sweep and/or cycle may involve taking amplitude measurements of an RF signal radiated by reference 602 and one of the first, third, fourth, and fifth antennas in a sequential fashion. For example, and as illustrated in FIG. 6, reference 602 may remain active in the second phase-shifter state while the first antenna sweeps and/or cycles through all 16 of the phase-shifter states. Subsequently, reference 602 may remain active in the second phase-shifter state while the third antenna sweeps and/or cycles through all 16 of the phase-shifter states. Afterward, reference 602 may remain active in the second phase-shifter state while the fourth antenna sweeps and/or cycles through all 16 of the phase-shifter states. Finally, reference 602 may remain active in the second phase-shifter state while the fifth antenna sweeps and/or cycles through all 16 of the phase-shifter states.

As illustrated in FIGS. 5 and 6, exemplary implementation 500 may include and/or represent a 5-element array with 16 phase-shifter states. In this example, implementation 500 may involve taking 80 (16*5=80) individual amplitude measurements at one angle. Additionally or alternatively, implementation 500 may involve taking 80 (16*4+16=80) combined and/or pairwise amplitude measurements at one angle. Further, implementation 500 may involve taking 5 three-dimensional (3D) antenna pattern measurements. Accordingly, the measurement total may include and/or represent 160 amplitude measurements and 5 full 3D antenna pattern measurements. This total may constitute and/or represent a significant reduction in the number of required measurements when compared to a conventional calibration scheme (e.g., 160 amplitude measurements and 5 full 3D pattern measurements versus 1,048,756 ($16^5$=1,048,756) full 3D pattern measurements for all phase-shifter combinations).

In some examples, by performing sweeps and/or cycles across pairs of antennas with multiple references, controller 102 may be able to determine and/or compute the phase values of all the antennas, including the initial reference, in the array. Additionally or alternatively, controller 102 may be able to reduce errors by averaging the phase values calculated from multiple references, thereby potentially improving the beamforming, performance, and/or coverage of the antenna system even further.

In some examples, upon determining and/or computing the amplitude and/or phase values for each antenna and phase-shifter state, controller 102 may determine and/or measure the individual element amplitude patterns of each antenna element in the array. In certain implementations, a single product and/or unit may include and/or implement multiple antenna arrays that point in different directions to provide coverage of a wide range of angles. Accordingly, to accurately characterize any or all inefficiencies (e.g., amplitude and/or phase errors or discrepancies) of a specific antenna array, controller 102 may consider and/or take into account the amplitude, phase, and/or pattern measurements, as well as the respective polarizations, for every antenna feed and/or element across all the arrays.

In some examples, controller 102 may take and/or collect amplitude measurements across the antenna array while using and/or applying multiple frequencies and/or polarizations (e.g., linear, circular, and/or elliptical). In one example, if the antenna system is equipped to control and/or modify the amplitude of radiated signals, controller 102 may take and/or collect measurements across the different amplitude settings.

In some examples, controller 102 and/or another processing device may collect all of the data (e.g., measurements, derivations, results, observations, knowledge, information, etc.) and/or push the data into the computational domain. In such examples, controller 102 and/or the other processing device may execute, apply, and/or perform one or more optimization algorithms or routines on the data to determine which phase-shifter settings provide the best possible coverage over the required range of steering angles for the antenna array. Examples of such optimization algorithms or routines include, without limitation, Gauss-Newton algorithms, linear regression algorithms, non-linear regression algorithms, least-squares fitting algorithms, Levenberg-Marquardt algorithms, convolutional neural networks, recurrent neural networks, supervised learning models, unsupervised learning models, logistic regression models, decision trees, support vector machine models, Naive Bayes models, k-nearest neighbor models, k-means models, random forest models, combinations or variations of one or more of the same, and/or any other suitable algorithms or routines.

In some examples, the various devices and systems described in connection with FIGS. 1-6 may include and/or represent one or more additional circuits, components, and/or features that are not necessarily illustrated and/or labeled in FIGS. 1-6. For example, antenna system 100 or 200 may also include and/or represent additional analog and/or digital circuitry, onboard logic, transistors, antennas, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support calibrating beamforming antennas to achieve optimized coverage. In certain implementations, one or more of these additional circuits, components, and/or features may be inserted and/or applied between any of the existing circuits, components, and/or features illustrated in FIGS. 1-6 consistent with the aims and/or objectives described herein. Accordingly, the electrical and/or communicative couplings described with reference to FIGS. 1-6 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

Figure 7:
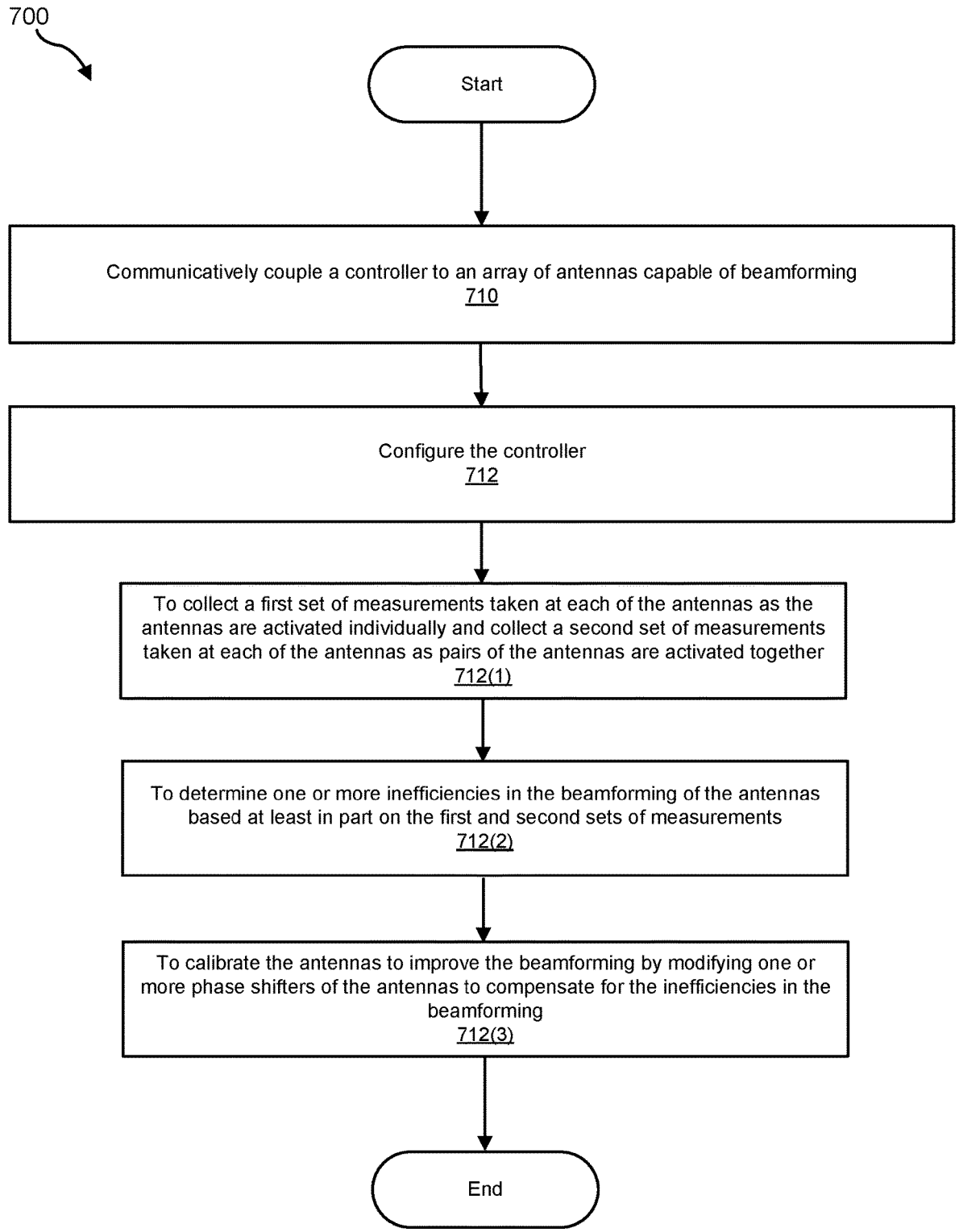
FIG. 7 is a flowchart of an exemplary method for calibrating beamforming antennas to achieve optimized coverage according to one or more embodiments of this disclosure.

FIG. 7 is a flow diagram of an exemplary method 700 for calibrating beamforming antennas to achieve optimized coverage. In one example, the steps shown in FIG. 7 may be performed during the manufacture and/or assembly of a radio and/or a wearable device. Additionally or alternatively, the steps shown in FIG. 7 may incorporate and/or involve various sub-steps and/or variations consistent with one or more of the descriptions provided above in connection with FIGS. 1-6.

As illustrated in FIG. 7, method 700 may include and/or involve the step of communicatively coupling a controller to an array of antennas capable of beamforming (710). Step 710 may be performed in a variety of ways, including any of those described above in connection with FIGS. 1-6. For example, a wearable equipment manufacturer or subcontractor may communicatively couple a controller to an array of antennas capable of beamforming.

In some examples, method 700 may also include and/or involve the step of configuring the controller to perform various tasks and/or actions that facilitate calibrating beamforming antennas to achieve optimized coverage (712). More specifically, step 712 may involve configuring the controller to collect a first set of measurements taken at each of the antennas as the antennas are activated individually and collect a second set of measurements taken at each of the antennas as pairs of the antennas are activated together (712(1)), to determine one or more inefficiencies in the beamforming of the antennas based at least on the first and second sets of measurements (712(2)), and/or to calibrate the antennas to improve the beamforming by modifying one or more phase shifters of the antennas to compensate for the inefficiencies in the beamforming (712(3)).

Step 712 and/or the corresponding sub-steps may be performed in a variety of ways, including any of those described above in connection with FIGS. 1-6. For example, the wearable equipment manufacturer or subcontractor may configure and/or program the controller to collect a first set of measurements taken at each of the antennas as the antennas are activated individually and/or to collect a second set of measurements taken at each of the antennas as pairs of the antennas are activated together. Additionally or alternatively, the wearable equipment manufacturer or subcontractor may configure and/or program the controller to determine one or more inefficiencies in the beamforming of the antennas based at least on the first and second sets of measurements and/or to calibrate the antennas to improve the beamforming by modifying one or more phase shifters of the antennas to compensate for the inefficiencies in the beamforming.

EXAMPLE EMBODIMENTS

Example 1: An antenna system comprising (1) an array of antennas capable of beamforming and (2) at least one controller communicatively to the array of antennas, wherein the controller (A) collects a first set of measurements taken at each of the antennas as the antennas are activated individually, (B) collects a second set of measurements taken at each of the antennas as pairs of the antennas are activated together, (C) determines one or more inefficiencies in the beamforming of the antennas based at least in part on the first and second sets of measurements, and (D) calibrates the antennas to improve the beamforming by modifying one or more phase shifters of the antennas to compensate for the inefficiencies in the beamforming.

Example 2: The antenna system of Example 1, wherein the controller (1) the first set of measurements comprises (A) a first set of amplitude measurements for the antennas taken as each of the antennas radiates a transmit signal individually and (B) a first set of amplitude measurements for the antennas taken as each of the antennas radiates a receive signal individually, and (2) the second set of measurements comprises (A) a second set of amplitude measurements for the pairs of antennas taken as the pairs of antennas simultaneously radiate the transmit signal and (B) a second set of amplitude measurements for the pairs of antennas taken as the pairs of antennas simultaneously radiate the receive signal.

Example 3: The antenna system of either Example 1 or Example 2, wherein the controller (1) determines a set of relative phases between the pairs of antennas as the pairs of antennas are activated together and (2) determines the inefficiencies in the beamforming of the antennas based at least in part on the set of relative phases and the first and second sets of measurements.

Example 4: The antenna system of any of Examples 1-3, wherein the controller calculates the set of relative phases based at least in part on (1) individual amplitude measurements taken as each of the antennas radiates an RF signal in isolation and (2) combined amplitude measurements taken as the pairs of antennas simultaneously radiate the RF signal.

Example 5: The antenna system of any of Examples 1-4, wherein (1) the inefficiencies in the beamforming comprise amplitude errors across the antennas and (2) the controller calculates the amplitude errors based at least in part on the individual amplitude measurements.

Example 6: The antenna system of any of Examples 1-5, wherein (1) the inefficiencies in the beamforming comprise phase errors across the antennas and (2) the controller calculates the phase errors based at least in part on the set of relative phases.

Example 7: The antenna system of any of Examples 1-6, wherein the controller (1) cycles through multiple states of the phase shifters as each of the antennas radiate an RF signal in isolation, (2) collects the first set of measurements by measuring isolated amplitudes of the RF signal as the multiple states of the phase shifters are cycled for the antennas, (3) cycles through the multiple states of the phase shifters as each of the pairs of antennas simultaneously radiate the RF signals, and (4) collects the second set of measurements by measuring combined amplitudes of the RF signal as the multiple states of the phase shifters are cycled for the pairs of antennas.

Example 8: The antenna system of any of Examples 1-7, wherein the controller (1) computes a total array pattern produced by the antennas based at least in part on (A) individual amplitude measurements taken as each of the antennas radiates an RF signal in isolation, (B) combined amplitude measurements taken as the pairs of antennas simultaneously radiate the RF signal, and (C) relative phases between the pairs of antennas as the pairs of antennas simultaneously radiate the RF signal and (2) determines the inefficiencies in the beamforming of the antennas based at least in part on the total array pattern produced by the antennas.

Example 9: The antenna system of any of Examples 1-8, wherein the controller computes the total array pattern produced by the antennas based further on at least one of (1) distances between the antennas, (2) steering angles of the antennas, and (3) angles of antenna pattern measurements.

Example 10: The antenna system of any of Examples 1-9, wherein the controller (1) collects a set of temperatures taken in connection with at least one component responsible for the first and second sets of measurements and (2) determines the inefficiencies in the beamforming of the antennas based at least in part on the set of temperatures.

Example 11: The antenna system of any of Examples 1-10, wherein (1) the first and second sets of measurements comprise amplitude measurements taken as the antennas radiate an RF signal, and (2) the controller (A) measures the set of temperatures and (B) modifies one or more of the amplitude measurements by compensating for one or more of the temperatures.

Example 12: The antenna system of any of Examples 1-11, wherein the controller determines the inefficiencies in the beamforming of the antennas by applying an optimization algorithm to amplitude or phase errors derived from the first and second sets of measurements.

Example 13: A wireless device comprising (1) a user interface, (2) an array of antennas capable of beamforming, and (3) at least one controller communicatively coupled to the array of antennas, wherein the controller (A) collects a first set of measurements taken at each of the antennas as the antennas are activated individually, (B) collects a second set of measurements taken at each of the antennas as pairs of the antennas are activated together, (C) determines one or more inefficiencies in the beamforming of the antennas based at least in part on the first and second sets of measurements, and (D) calibrates the antennas to improve the beamforming by modifying one or more phase shifters of the antennas to compensate for the inefficiencies in the beamforming.

Example 14: The wireless device of Example 13, wherein the controller (1) the first set of measurements comprises (A) a first set of amplitude measurements for the antennas taken as each of the antennas radiates a transmit signal individually and (B) a first set of amplitude measurements for the antennas taken as each of the antennas radiates a receive signal individually, and (2) the second set of measurements comprises (A) a second set of amplitude measurements for the pairs of antennas taken as the pairs of antennas simultaneously radiate the transmit signal and (B) a second set of amplitude measurements for the pairs of antennas taken as the pairs of antennas simultaneously radiate the receive signal.

Example 15: The wireless device of either Example 13 or Example 14, wherein the controller (1) determines a set of relative phases between the pairs of antennas as the pairs of antennas are activated together and (2) determines the inefficiencies in the beamforming of the antennas based at least in part on the set of relative phases and the first and second sets of measurements.

Example 16: The wireless device of any of Examples 13-15, wherein the controller calculates the set of relative phases based at least in part on (1) individual amplitude measurements taken as each of the antennas radiates an RF signal in isolation and (2) combined amplitude measurements taken as the pairs of antennas simultaneously radiate the RF signal.

Example 17: The wireless device of any of Examples 13-16, wherein (1) the inefficiencies in the beamforming comprise amplitude errors across the antennas and (2) the controller calculates the amplitude errors based at least in part on the individual amplitude measurements.

Example 18: The wireless device of any of Examples 13-17, wherein (1) the inefficiencies in the beamforming comprise phase errors across the antennas and (2) the controller calculates the phase errors based at least in part on the set of relative phases.

Example 19: The wireless device of any of Examples 13-18, wherein the controller (1) cycles through multiple states of the phase shifters as each of the antennas radiate an RF signal in isolation, (2) collects the first set of measurements by measuring isolated amplitudes of the RF signal as the multiple states of the phase shifters are cycled for the antennas, (3) cycles through the multiple states of the phase shifters as each of the pairs of antennas simultaneously radiate the RF signals, and (4) collects the second set of measurements by measuring combined amplitudes of the RF signal as the multiple states of the phase shifters are cycled for the pairs of antennas.

Example 20: A method comprising (1) communicatively coupling a controller to an array of antennas capable of beamforming and (2) configuring the controller to (A) collect a first set of measurements taken at each of the antennas as the antennas are activated individually, (B) collect a second set of measurements taken at each of the antennas as pairs of the antennas are activated together, (C) determine one or more inefficiencies in the beamforming of the antennas based at least in part on the first and second sets of measurements, and/or (D) calibrate the antennas to improve the beamforming by modifying one or more phase shifters of the antennas to compensate for the inefficiencies in the beamforming.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
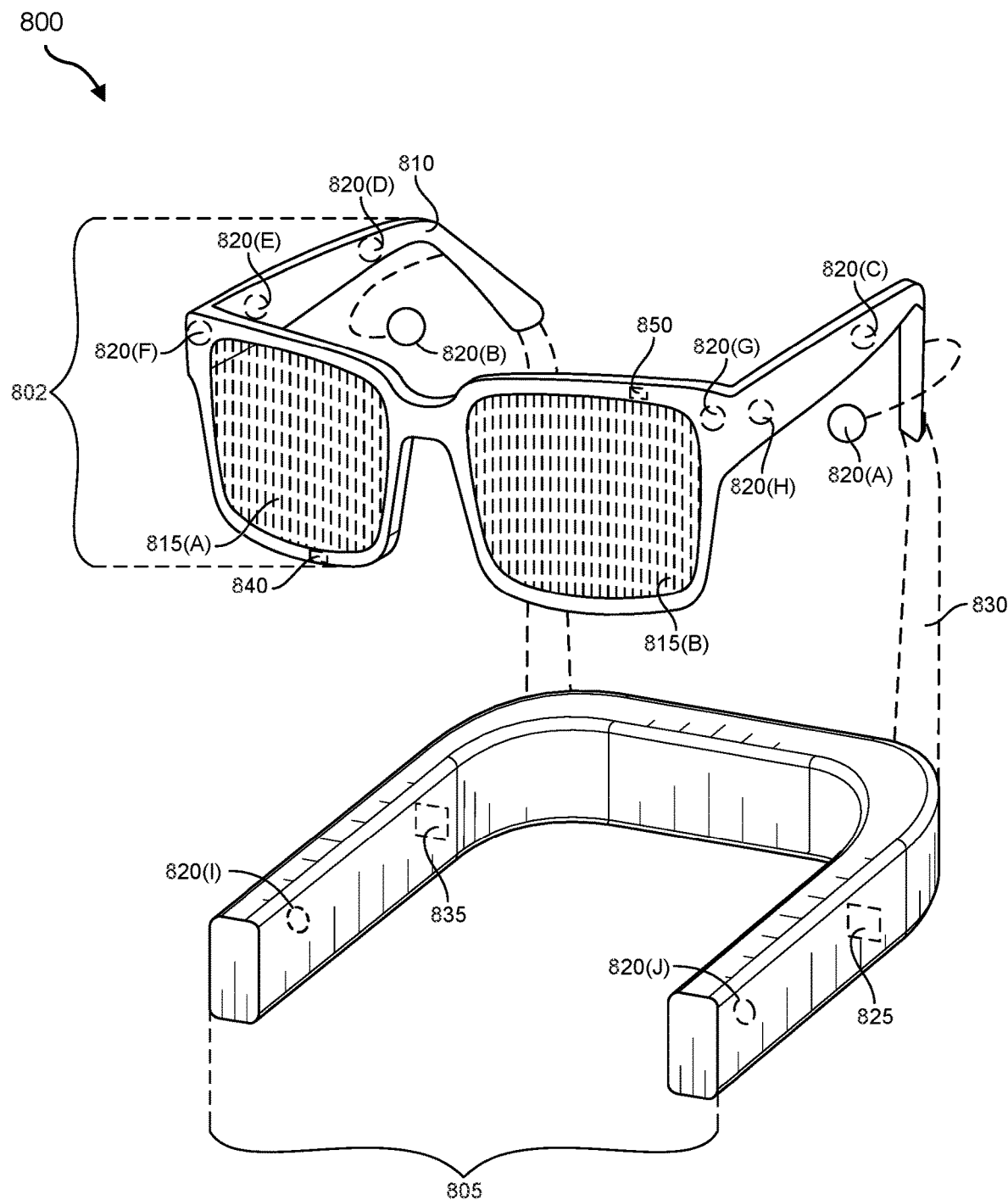
FIG. 8 is an illustration of exemplary augmented-reality system that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820 (G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality system 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 800 and 900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
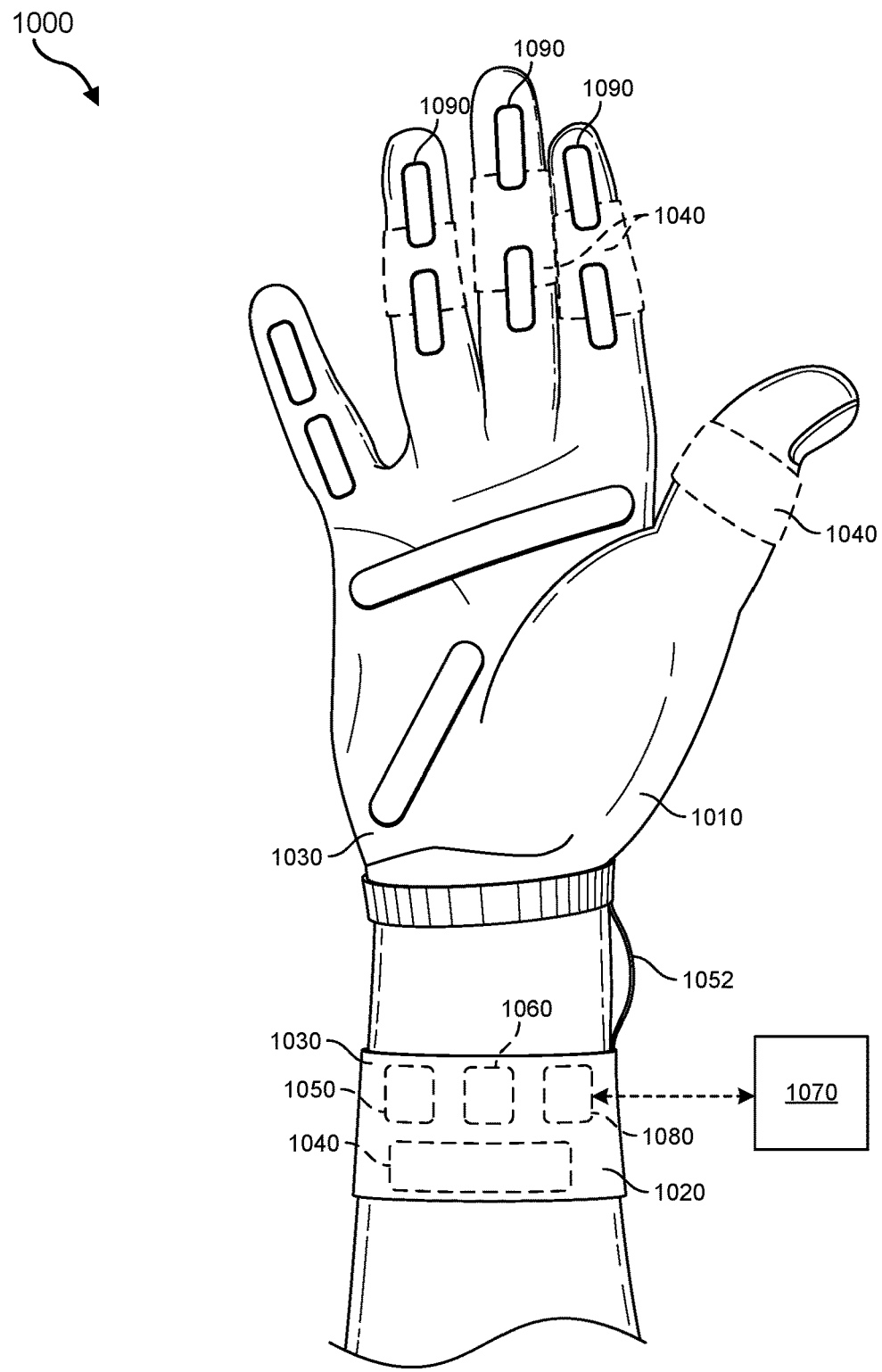
FIG. 10 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070. For example, vibrotactile system 1000 may, in some examples, include a communications interface 1080 for receiving and/or sending signals to the other device or system 1070. The other device or system 1070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, BLUETOOTH, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
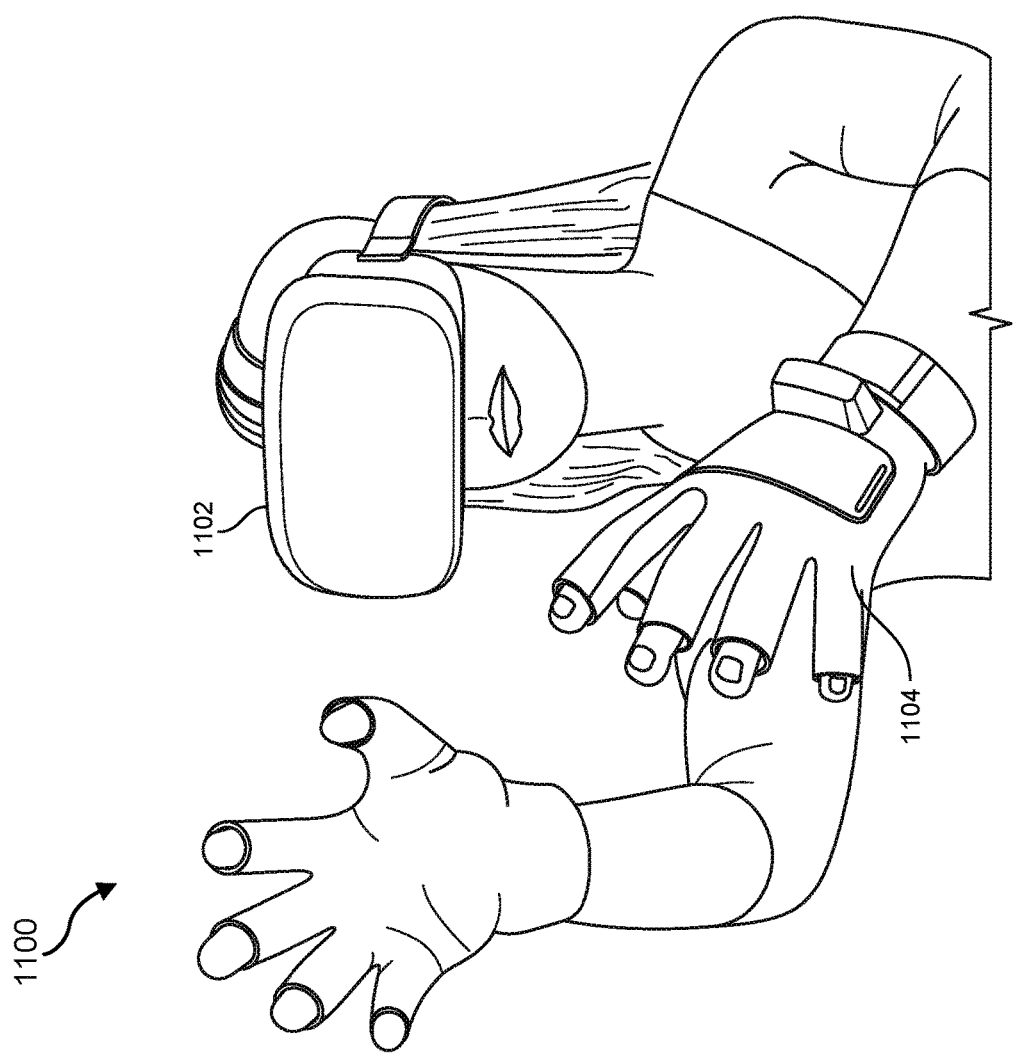
FIG. 11 is an illustration of an exemplary virtual-reality environment according to embodiments of this disclosure.

Haptic wearables, such as those shown in and described in connection with FIG. 10, may be implemented in a variety of types of artificial-reality systems and environments. FIG. 11 shows an example artificial-reality environment 1100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 9:
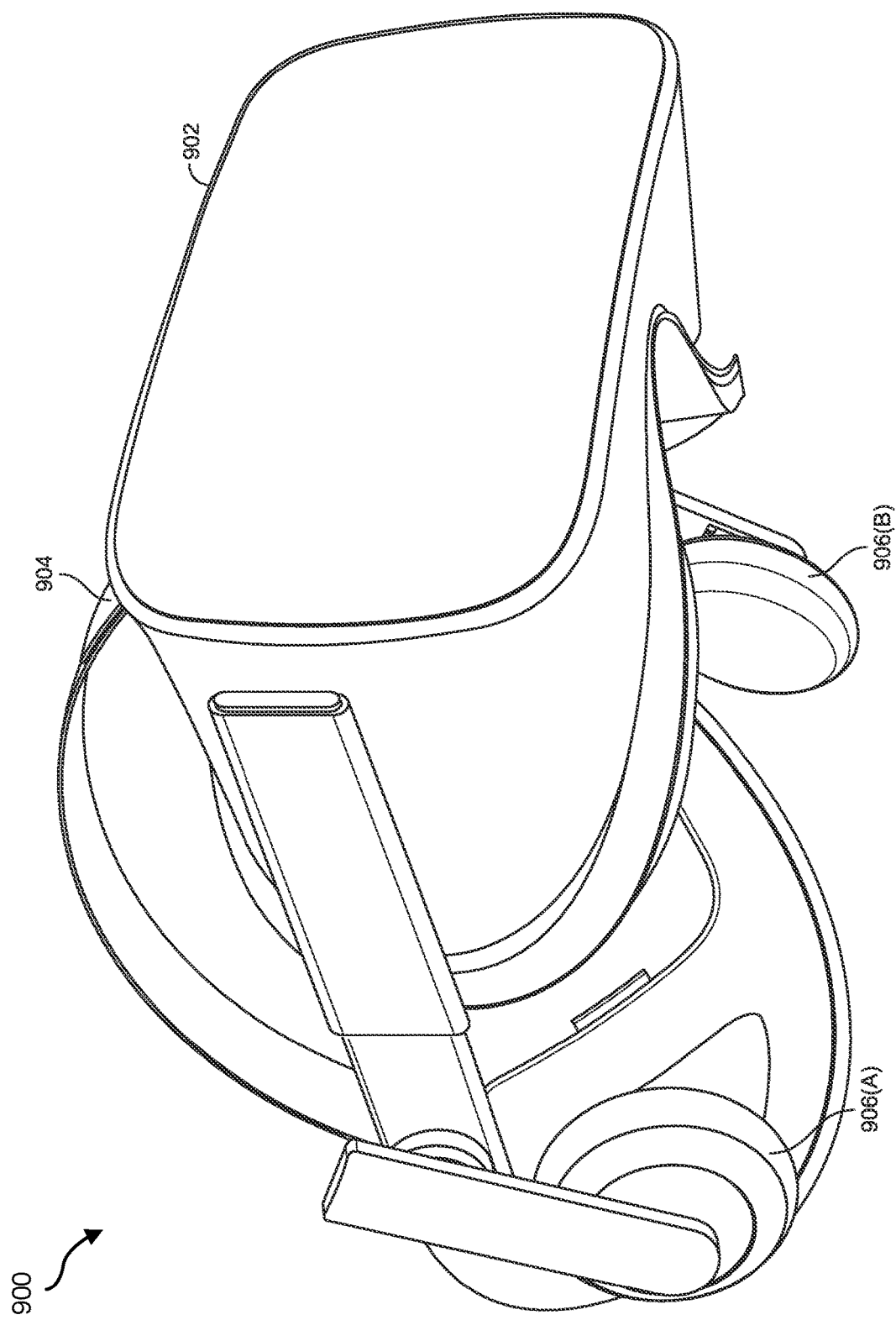
FIG. 9 is an illustration of an exemplary virtual-reality system that may be used in connection with embodiments of this disclosure.

Head-mounted display 1102 generally represents any type or form of virtual-reality system, such as virtual-reality system 900 in FIG. 9. Haptic device 1104 generally represents any type or form of wearable device, worn by a user of an artificial-reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
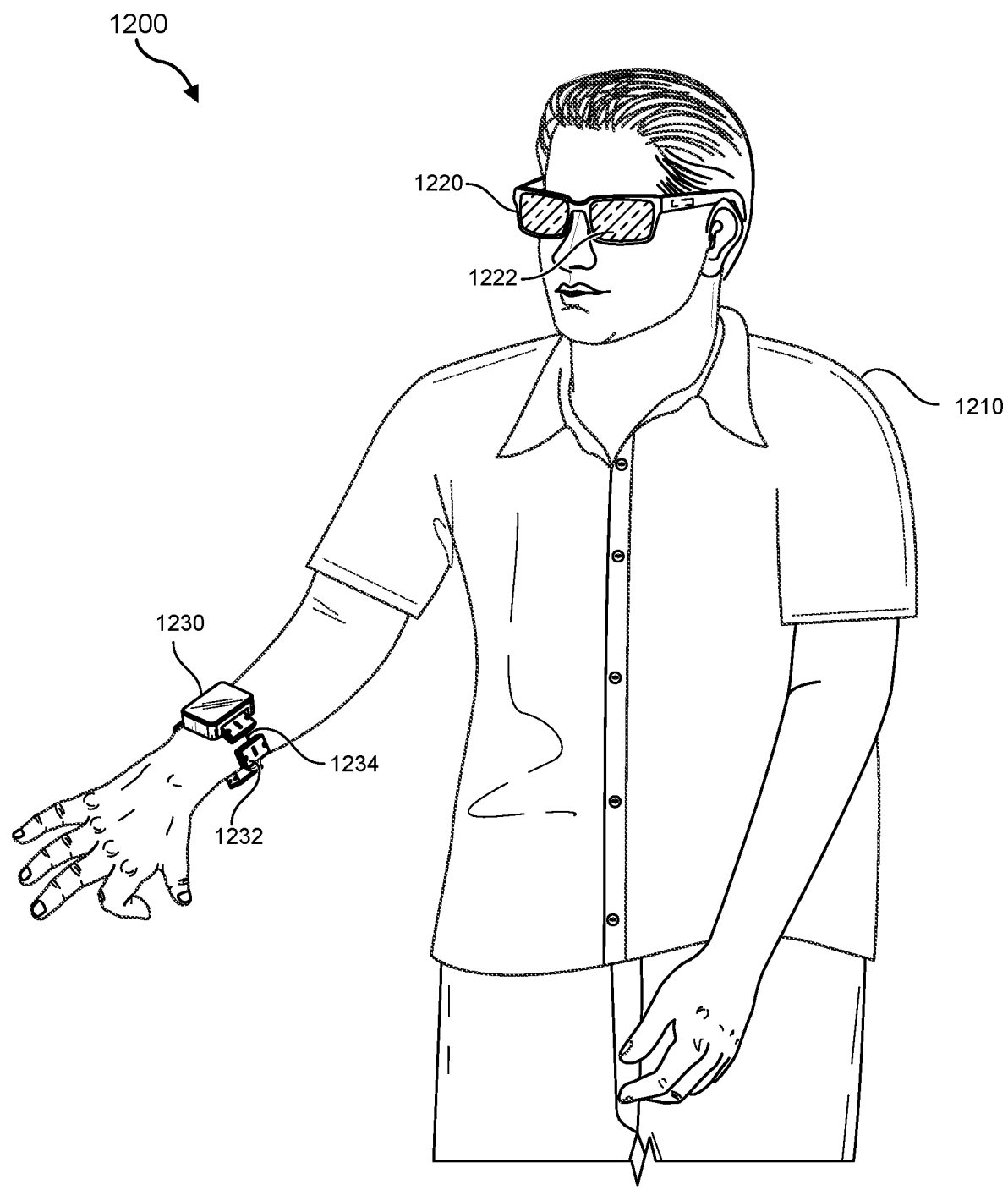
FIG. 12 is an illustration of an exemplary augmented-reality environment according to embodiments of this disclosure.

While haptic interfaces may be used with virtual-reality systems, as shown in FIG. 11, haptic interfaces may also be used with augmented-reality systems, as shown in FIG. 12. FIG. 12 is a perspective view of a user 1210 interacting with an augmented-reality system 1200. In this example, user 1210 may wear a pair of augmented-reality glasses 1220 that may have one or more displays 1222 and that are paired with a haptic device 1230. In this example, haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An antenna system comprising:
an array of antennas capable of beamforming; and
at least one controller communicatively coupled to the array of antennas, wherein the controller:
   collects a first set of measurements taken at each of the antennas as the antennas are activated individually;
   collects a second set of measurements taken at each of the antennas as pairs of the antennas are activated together;
   determines one or more inefficiencies in the beamforming of the antennas based at least in part on the first and second sets of measurements; and
   calibrates the antennas to improve the beamforming by modifying one or more phase shifters of the antennas to compensate for the inefficiencies in the beamforming.

2. The antenna system of claim 1, wherein:
the first set of measurements comprises:
   a first set of amplitude measurements for the antennas taken as each of the antennas radiates a transmit signal individually; and
   a first set of amplitude measurements for the antennas taken as each of the antennas radiates a receive signal individually; and
the second set of measurements comprises:
   a second set of amplitude measurements for the pairs of antennas taken as the pairs of antennas simultaneously radiate the transmit signal; and
   a second set of amplitude measurements for the pairs of antennas taken as the pairs of antennas simultaneously radiate the receive signal.

3. The antenna system of claim 1, wherein the controller:
determines a set of relative phases between the pairs of antennas as the pairs of antennas are activated together; and
determines the inefficiencies in the beamforming of the antennas based at least in part on the set of relative phases and the first and second sets of measurements.

4. The antenna system of claim 3, wherein the controller calculates the set of relative phases based at least in part on:
individual amplitude measurements taken as each of the antennas radiates an RF signal in isolation; and
combined amplitude measurements taken as the pairs of antennas simultaneously radiate the RF signal.

5. The antenna system of claim 4, wherein:
the inefficiencies in the beamforming comprise amplitude errors across the antennas; and
the controller calculates the amplitude errors based at least in part on the individual amplitude measurements.

6. The antenna system of claim 3, wherein:
the inefficiencies in the beamforming comprise phase errors across the antennas; and
the controller calculates the phase errors based at least in part on the set of relative phases.

7. The antenna system of claim 1, wherein the controller:
cycles through multiple states of the phase shifters as each of the antennas radiate an RF signal in isolation;
collects the first set of measurements by measuring isolated amplitudes of the RF signal as the multiple states of the phase shifters are cycled for the antennas;
cycles through the multiple states of the phase shifters as each of the pairs of antennas simultaneously radiate the RF signal; and collects the second set of measurements by measuring combined amplitudes of the RF signal as the multiple states of the phase shifters are cycled for the pairs of antennas.

8. The antenna system of claim 1, wherein the controller: computes a total array pattern produced by the antennas based at least in part on:
   individual amplitude measurements taken as each of the antennas radiates an RF signal in isolation; and
   combined amplitude measurements taken as the pairs of antennas simultaneously radiate the RF signal; and
   relative phases between the pairs of antennas as the pairs of antennas simultaneously radiate the RF signal; and
determines the inefficiencies in the beamforming of the antennas based at least in part on the total array pattern produced by the antennas.

9. The antenna system of claim 8, wherein the controller computes the total array pattern produced by the antennas based further on at least one of:
   distances between the antennas;
   steering angles of the antennas; and
   angles of antenna pattern measurements.

10. The antenna system of claim 1, wherein the controller: collects a set of temperatures taken in connection with at least one component responsible for the first and second sets of measurements; and
determines the inefficiencies in the beamforming of the antennas based at least in part on the set of temperatures.

11. The antenna system of claim 10, wherein:
the first and second sets of measurements comprise amplitude measurements taken as the antennas radiate an RF signal; and
the controller:
   measures the set of temperatures; and
   modifies one or more of the amplitude measurements by compensating for one or more of the temperatures.

12. The antenna system of claim 10, wherein the controller determines the inefficiencies in the beamforming of the antennas by applying an optimization algorithm to amplitude or phase errors derived from the first and second sets of measurements.

13. A wireless device comprising:
a user interface;
an array of antennas capable of beamforming; and
at least one controller communicatively coupled to the array of antennas, wherein the controller:
   collects a first set of measurements taken at each of the antennas as the antennas are activated individually;
   collects a second set of measurements taken at each of the antennas as pairs of the antennas are activated together;
   determines one or more inefficiencies in the beamforming of the antennas based at least in part on the first and second sets of measurements; and
   calibrates the antennas to improve the beamforming by modifying one or more phase shifters of the antennas to compensate for the inefficiencies in the beamforming.

14. The wireless device of claim 13, wherein:
the first set of measurements comprises:
   a first set of amplitude measurements for the antennas taken as each of the antennas radiates a transmit signal individually; and
   a first set of amplitude measurements for the antennas taken as each of the antennas radiates a receive signal individually; and
the second set of measurements comprises:
   a second set of amplitude measurements for the pairs of antennas taken as the pairs of antennas simultaneously radiate the transmit signal; and
   a second set of amplitude measurements for the pairs of antennas taken as the pairs of antennas simultaneously radiate the receive signal.

15. The wireless device of claim 13, wherein the controller:
determines a set of relative phases between the pairs of antennas as the pairs of antennas are activated together; and
determines the inefficiencies in the beamforming of the antennas based at least in part on the set of relative phases and the first and second sets of measurements.

16. The wireless device of claim 15, wherein the controller calculates the set of relative phases based at least in part on:
individual amplitude measurements taken as each of the antennas radiates an RF signal in isolation; and
combined amplitude measurements taken as the pairs of antennas simultaneously radiate the RF signal.

17. The wireless device of claim 16, wherein:
the inefficiencies in the beamforming comprise amplitude errors across the antennas; and
the controller calculates the amplitude errors based at least in part on the individual amplitude measurements.

18. The wireless device of claim 16, wherein:
the inefficiencies in the beamforming comprise phase errors across the antennas; and
the controller calculates the phase errors based at least in part on the set of relative phases.

19. The wireless device of claim 13, wherein the controller:
cycles through multiple states of the phase shifters as each of the antennas radiate an RF signal in isolation;
collects the first set of measurements by measuring isolated amplitudes of the RF signal as the multiple states of the phase shifters are cycled for the antennas;
cycles through the multiple states of the phase shifters as each of the pairs of antennas simultaneously radiate the RF signal; and
collects the second set of measurements by measuring combined amplitudes of the RF signal as the multiple states of the phase shifters are cycled for the pairs of antennas.

20. A method comprising:
communicatively coupling a controller to an array of antennas capable of beamforming; and
configuring the controller to:
   collect a first set of measurements taken at each of the antennas as the antennas are activated individually;
   collect a second set of measurements taken at each of the antennas as pairs of the antennas are activated together;
   determine one or more inefficiencies in the beamforming of the antennas based at least in part on the first and second sets of measurements; and
   calibrate the antennas to improve the beamforming by modifying one or more phase shifters of the antennas to compensate for the inefficiencies in the beamforming.

* * * * *